(12) United States Patent
McLean et al.

(10) Patent No.: US 8,135,949 B2
(45) Date of Patent: Mar. 13, 2012

(54) DIGITAL CONTENT DISTRIBUTION

(75) Inventors: Ivan Hugh McLean, San Diego, CA (US); Andrew Augustine Wajs, Haarlem (NL)

(73) Assignee: Irdeto Access B.V. (NL)

( * ) Notice: Subject to any disclaimer, the term of this patent is extended or adjusted under 35 U.S.C. 154(b) by 1019 days.

(21) Appl. No.: 11/936,919

(22) Filed: Nov. 8, 2007

(65) Prior Publication Data
US 2010/0027795 A1 Feb. 4, 2010

Related U.S. Application Data

(62) Division of application No. 10/468,625, filed on Mar. 1, 2004, now Pat. No. 7,433,472.

(60) Provisional application No. 60/342,718, filed on Dec. 19, 2001.

(30) Foreign Application Priority Data

Dec. 18, 2002 (WO) .................. PCT/EP02/14828

(51) Int. Cl.
*H04L 9/32* (2006.01)
(52) U.S. Cl. ............... 713/153; 713/160; 713/161
(58) Field of Classification Search .............. None
See application file for complete search history.

(56) References Cited

U.S. PATENT DOCUMENTS

| | | | |
|---|---|---|---|
| 5,872,784 A * | 2/1999 | Rostoker et al. ...... 370/395.64 |
| 6,792,111 B1 | 9/2004 | Italia et al. | |
| 6,948,186 B1 | 9/2005 | Brosey | |
| 7,116,894 B1 | 10/2006 | Chatterton | |
| 7,433,472 B2 | 10/2008 | McLean et al. | |
| 7,895,616 B2 * | 2/2011 | Unger ........................ 725/31 |
| 2001/0012366 A1 | 8/2001 | Van Rijnsoever et al. | |

FOREIGN PATENT DOCUMENTS

| EP | 1041823 A2 | 10/2000 |
|---|---|---|
| EP | 1143722 A1 | 10/2001 |

OTHER PUBLICATIONS

"U.S. Appl. No. 10/468,625, Non-Final Office Action Mailed Aug. 7, 2007", OARN, 3 pgs.
"PCT International Search Report fo International Allication No. PCT/EP02/14828, Mailed Oct. 10, 2003", 4 pgs.
"Restriction Requirement Response filed Jul. 9, 2007 in U.S. Appl. No. 10/468,625".

(Continued)

*Primary Examiner* — Pramila Parthasarathy
(74) *Attorney, Agent, or Firm* — Schwegman, Lindberg & Woessner, P.A.

(57) ABSTRACT

A method comprising distributing digital data encoding content and arranged into messages from a server to one or more client terminals through a network, each message being decodable by a decoder application on a client terminal, said method including transmitting a plurality of data packets from the server through a network through a network interface of the server, each packet including at least one header and a payload, each payload including at least part of a message, and providing each message to a first of a series of at least one service interface between two layers in a protocol stack, installed on the server, each service interface configured to add at least one packet header to the packet encoding information enabling the client to process the remainder of the packet.

42 Claims, 7 Drawing Sheets

OTHER PUBLICATIONS

Wee, S J., et al., "Secure Scalable Streaming Enabling Transcoding Without Decryption", *Proceedings 2001 International Conference on Image Processing*, ICIP 2001, vol. 1 or 3, Conf 8., (Oct. 7, 2001),437-440.

"Japanese Application Serial No. 2003-553448, Office Action mailed May 12, 2009", 9 pgs.

Wakao, Satoru, et al., "An Implementation of Cryptography on MPEG-4 IPMP System", *Technical Report of IEICE (ISEC 2000-23 to 57)*, Japan, IEICE, vol. 100, No. 213, (Jul. 18, 2000), 9-16.

Worrall, S. T., et al., "Backward Compatible User-Defined Data Insertion Into MPEG-4 Bitstreams", *Electronics Letters*, vol. 36, No. 12, (Jun. 8, 2000), 1036-1037.

U.S. Appl. No. 10/468,625, Response filed Apr. 14, 2008 to Notice of Non-Compliant Amendment mailed Mar. 17, 2008, 12 pgs.

U.S. Appl. No. 10/468,625, Response filed Dec. 7, 2007 to Non-Final Office Action mailed Aug. 7, 2007, 11 pgs.

U.S. Appl. No. 10/468,625, Notice of Allowance mailed Jun. 3, 2008, 6 pgs.

* cited by examiner

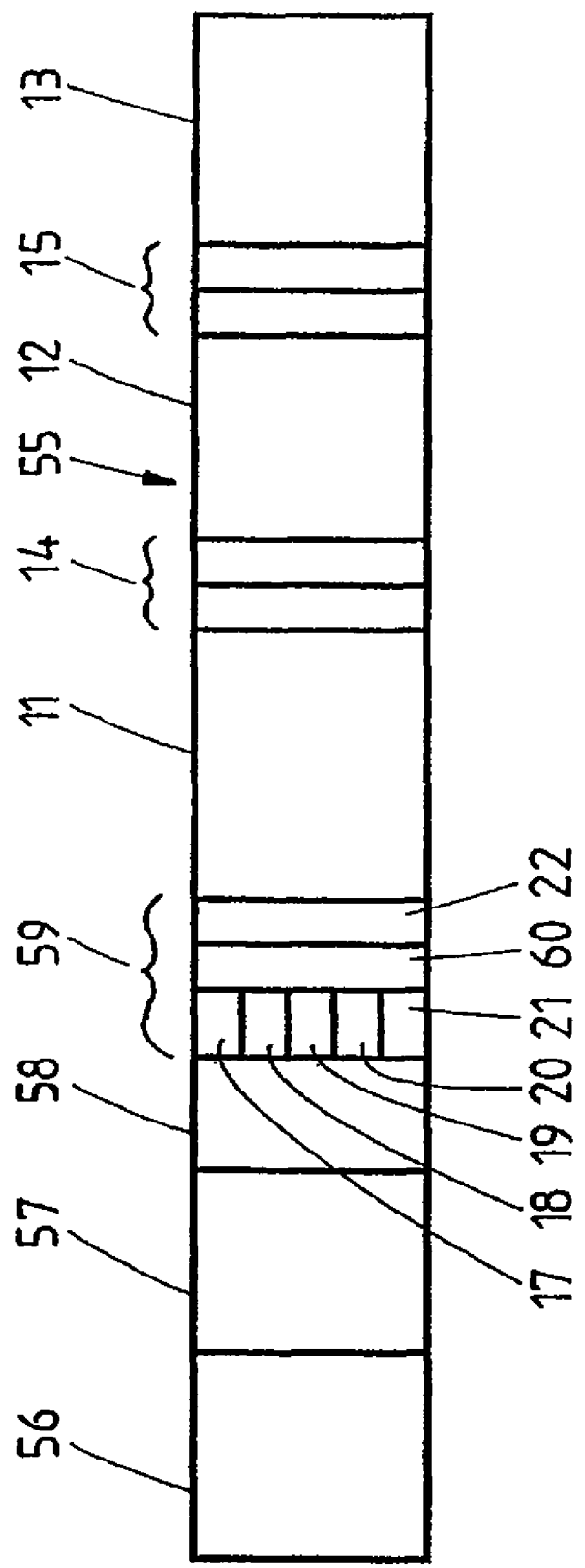

DIGITAL CONTENT DISTRIBUTION

The present patent application is a divisional application of U.S. patent application Ser. No. 10/468,625 filed Mar. 1, 2004 now U.S. Pat. No. 7,433,472 that claims the priority benefit of the filing date of PCT Application No. PCT/EP02/14828 filed Dec. 18, 2002 and U.S. Provisional Application No. 60/342,718 filed Dec. 19, 2001, the entire content of each of the above applications being incorporated herein by reference.

This invention relates to cryptographic protocols for use, for example, in performing effective content level encryption (e.g., on MPEG-4 bit streams).

In particular, the invention relates to a method of generating cryptographically protected digital data encoding content and arranged into messages, each message being decodable by a decoder application on a client terminal having a service interface to assemble each message for the decoder application, the method including:
retrieving a message from a machine-readable medium;
encrypting at least part of the message; and
providing the encrypted messages as output in a format enabling a server service interface to arrange the message into at least one packet including at least one header and a payload, each payload including at least part of the message, at least one header including information enabling the service interface on the client to assemble each message for the decoder application from the payload of the packets.

The invention further relates to a server for enabling decryption of cryptographically protected data encoding content and arranged into messages, generated by means of such a method.

The invention also relates to a system for generating cryptographically protected digital data encoding content and arranged into messages, each message being decodable by a decoder application on a client terminal having a service interface to assemble each message for the decoder application, the system being configured to:
retrieve a message from a machine-readable medium;
encrypt at least part of the message; and to
provide the encrypted messages as output in a format enabling a server service interface to arrange the message into at least one packet including at least one header and a payload, each payload including at least part of the message, at least one header including information enabling the service interface on the client to assemble each message for the decoder application from the payload of the packets.

The invention further relates to a method of distributing digital data encoding content and arranged into messages from a server to one or more client terminals through a network, each message being decodable by a decoder application on a client terminal, said method including: transmitting a plurality of data packets from the server through a network through a network interface of the server, each packet including at least one header and a payload, each payload including at least part of a message; providing each message to a first of a series of at least one service interface between two layers in a protocol stack, installed on the server, each service interface configured to add at least one packet header to the packet encoding information enabling the client to process the remainder of the packet, the method further comprising transmitting packets including at least one header including information enabling a service interface on the client to assemble each message for the decoder application from the payload of the packets.

The invention also relates to a server for distributing digital data encoding content and arranged into messages to one or more client terminals through a network, each message being decodable by a decoder application on a client terminal, said server including:
a network interface for transmitting a plurality of data packets from the server through a network, each packet including at least one header and a payload, each payload including at least part of a message, the server further including a series of at least one service interface between two layers in a protocol stack, each service interface configured to add at least one packet header to the packet encoding information enabling the client to process the remainder of the packet, the server being configured to transmit packets including at least one header including information enabling a service interface on the client to assemble each message for the decoder application from the payload of the packets.

The invention also relates to a client terminal for receiving and processing digital data encoding content and arranged into messages, each message being decodable by a decoder application, comprising
an interface for receiving a plurality of data packets, each packet including at least one header and a payload, the terminal further including a series of at least one service interface between two layers in a protocol stack, each service interface configured to remove at least one packet header from the packet and process the remainder of the packet using information encoded in the removed packet header, including a service interface configured to assemble the messages for the decoder application from the payload of at least one packet, using information included in at least one header of the packet.

The invention also relates to a method for receiving and processing in a client terminal digital data encoding content and arranged into messages, each message being decodable by a decoder application, comprising
receiving a plurality of data packets by means of an interface of the client terminal, each packet including at least one header and a payload;
providing each packet to a first of a series of at least one service interface between two layers in a protocol stack, each service interface configured to remove at least one packet header from the packet and process the remainder of the packet using information encoded in the removed packet header, including a service interface configured to assemble the messages for the decoder application from the payload of at least one packet, using information included in at least one header of the packet.

The invention also relates to a computer program loadable into a computer and having the potential, when run on the computer, to provide the computer with the functionality of such a system, server or client terminal.

The invention lastly relates to a computer program loadable into a computer and having the potential, when run on the computer, to enable the computer to execute one of the above-mentioned types of methods.

Examples of such systems and methods are known, e.g. from international standard ISO/IEC 14496-1, known as MPEG (Moving Pictures Expert Group)-4.

MPEG and MPEG-4 are standards that have been proposed and, in the case of MPEG, are widely used in the distribution of video and, to a lesser degree, other forms of content. Moreover, applications such as distributing digital content over the Internet and others, have created a need for encrypting content, whether in the MPEG, MPEG-4 or any other format.

The MPEG-4 standard specifies an architecture of which the basic building blocks are formed by a scene description and elementary streams that convey streaming data. To distribute the streaming data, it is conveyed in SL-packetised streams (SPS). The packets contain elementary stream data partitioned in access units as well as side information, e.g. for timing and access unit labelling. The timing model relies on clock references and time stamps to synchronise audio-visual data conveyed by the one or more elementary streams. The concept of a clock with its associated clock references is used to convey the notion of time to a receiving terminal. Time stamps are used to indicate the precise time instants at which the receiving terminal consumes the access units in decoding buffers. An object time base (OTB) defines the notion of time for a given data stream. The resolution of this OTB can be selected as required by the application or as defined by a profile. All time stamps that the sending terminal inserts in a coded data stream refer to this time base. The OTB of a data stream is known at the receiving terminal by means of object clock reference (OCR) time stamps in the SL packet headers for this stream or by means of an indication of the elementary stream from which this object descriptor stream inherits the time base.

The object description framework consists of a set of descriptors that allows to identify, describe and properly associate elementary stream to each other and to audio-visual objects used in the scene description. Object descriptors are a collection of descriptors that describe one or more elementary streams that are associated to a single node in the scene. An elementary stream descriptor within an object descriptor identifies a single elementary stream. Each elementary stream descriptor contains the information necessary to initiate and configure the decoding process for the elementary stream, as well as intellectual property identification. Intellectual Property Management and Protection (IPMP) information is conveyed both through IPMP descriptors as part of the object descriptor stream and through IPMP streams, elementary streams that carry time variant IPMP information, in particular content encryption keys. Keys are associated with the content or other streams via appropriate IPMP stream descriptors. These keys must be synchronised with the content stream. The existing MPEG-4 model is used for delay and synchronisation management. Thus, the decryption application in the receiving terminal must appropriately manage time stamping.

The MPEG-4 bit stream syntax in its current form offers no explicit support for resynchronisation of the decryption process in the event that parts of the encrypted content bit stream are lost during transmission. Since the transport layer is not specified by MPEG-4 it is not possible to utilize characteristics of the underlying transport protocol for synchronization. MPEG-4 media may also be played back locally, in which case there is no transport involved. In an error-prone environment, the loss of a single bit would effectively destroy the remainder of the frame. There are many ciphers and associated modes that cannot perform self-synchronization, but that are very attractive under a wide range of evaluation criteria. Currently, these must all be ruled out, simply because there is not support in the extensions for the synchronization of the decryption process in the event of data loss.

SUMMARY OF THE INVENTION

The present invention provides a method and system for generating cryptographically protected digital data encoding content and for distributing the digital data, and a client terminal and method for receiving and processing the digital data of the type mentioned above, that implement a data distribution system in which the content is adequately protected against unauthorised access and which shows improved error resilience.

The invention achieves this by providing a method of generating cryptographically protected digital data encoding content and arranged into messages, each message being decodable by a decoder application on a client terminal having a service interface to assemble each message for the decoder application, the method including:
retrieving a message from a machine-readable medium;
encrypting at least part of the message; and
providing the encrypted messages as output in a format enabling a server service interface to arrange the message into at least one packet including at least one header and a payload, each payload including at least part of the message, at least one header including information enabling the service interface on the client to assemble each message for the decoder application from the payload of the packets, wherein the method comprises separating each message into a first and at least one further message section, wherein at least one of the message sections is encrypted in such a way as to be decryptable independently of the other message sections, and wherein the encrypted message is assembled by adding a resynchronisation marker, separating a message section from an adjacent message section and including explicit synchronisation information, to at least the further message sections.

A message is the unit of data that is transmitted from the encoder program that encoded the content to the decoder application on the client, which is arranged to process the individual messages to decode the content. The content may, for example, be video, audio, or text. A service interface is an interface implementing part of a protocol in a protocol stack and providing a communication service that applications at one level of the protocol stack can use to exchange messages, using the functionality of protocols at a different level in the protocol stack. Advantageously, this is a network protocol stack, for example conform the OSI network architecture. However, the service interface may also provide an interface between application programs and a system's operating system, translating, for example the message into packets defined for the file system of the operating system. The term "independently" is used to indicate that each encrypted message section can be decrypted without knowledge of the ciphertext or plaintext of another message section. In the context of the present application, a header is a piece of data preceding or following the payload of a packet and encoding information describing something about the packet or its payload. A packet is a self-contained, independent entity of data carrying sufficient information to be routed from a source to a destination without reliance on earlier exchanges between this source and destination and the interface between them.

Because each message section is independently decryptable, and because the resynchronisation markers provide an explicit indication of the boundaries between adjacent encrypted message sections, an error or loss of data in one section does not influence the client's ability to decrypt the other message sections. In other words, the lack of all or part of any preceding data blocks does not influence the ability to decrypt the current data block in the client. By adapting the size of the message sections, and thus the number of resynchronisation markers, more or less resilience can be provided. Furthermore, it is possible to encrypt only a few of the sections of a message, reducing the amount of decryption processing time and power required of the client.

It is noted that the MPEG-4 bit stream syntax defines resynchronisation markers (Resync Markers). Resync Markers offer error resilience by increasing the opportunities for resynchronisation between the decoder and the bit stream after a residual error or errors have been detected. Typically, data between the synchronization point prior to the error and the point at which resynchronisation is established is discarded. These markers are guaranteed to be unique for valid, unencrypted MPEG-4 content. While this construct works well for clear content, it is not very well suited to content that is encrypted after being coded. This seems to hold regardless of whether selective encryption or brute force encryption of the entire message is used. This is so, because while it is not possible for valid clear content to emulate a Resync Marker, this does not hold for encrypted data. More importantly, the MPEG-4 standard does not disclose encrypting at least one of the message sections in such a way as to be decryptable independently of the other message sections, so that, in case of data loss, complicated and often inadequate error recovery techniques are needed to re-construct the complete message, before it can be decrypted by the client.

In a preferred embodiment of the invention, the message sections are encrypted using at least one key having a cycling value.

Thus, improved security against cryptographic analysis on distributed content data is provided.

Preferably, each resynchronisation marker further includes a unique sequence number.

The usage of sequence numbers addresses all of the problems surrounding the requirement to allow random access into the encrypted media stream. It provides a cryptographic framework that enables synchronisation of cycling session keys with associated media and does not impose state dependency on either the sender or receiver in a content distribution system.

The MPEG-4 bit stream syntax in its current form offers no explicit support for resynchronisation of the decryption process in the event that the user performs a random seek into the encrypted content bit stream. At the content-level, MPEG-4 does not specify any dependable continuity or sequencing information that may be relied on during decryption. Use of Sync Layer information is problematic, since traditionally all SL information is discarded prior to decryption. Retention and delivery of SL information to an IPMP tool would represent a significant obstacle for most terminal implementations. Timing information cannot be used for synchronisation, since DTS/CTS may change from the time that the content is secured, to the point where content is consumed.

Traditionally, media formats have used explicit sequencing information and/or uniform packet size in order to aid the encryption/decryption processes. MPEG-4 media may also be played back locally, in which case there is not transport involved. Even if one could define a normative mapping to the transport layer sequencing information, this would be of little help, since this information is not known at the time that the media is secured.

The availability of a unique sequence number allows for effective management of transitions during key cycling. A sequence number allows packaging and delivery of the content from a media server while delivering keys independently from that server in a reliable way (such as media carried on MPEG-2 or stored on DVD/CD-ROM and IPMP carried on IP (Internet Protocol) networks ahead of time). The presence of unique sequence information also allows for sending the entire key stream prior to the delivery of any media.

Although the MPEG-4 IPMP Message stream provides the ability to deliver cycled session keys in band, the MPEG-4 standard fails to provide a reliable mechanism whereby the timing of the delivery of a new key may be related to a particular media access unit.

Media Time (DTS/CTS) cannot be used for this purpose, since this may change from the time that the content is secured, to the point where the content is consumed.

Furthermore, media streams and IPMP message streams carrying decryption keys could suffer very different delivery jitters, packet loss or network congestion and a tight synchronisation using time-stamps would be almost impossible to achieve if IPMP message streams are sent to the client from a different server. As no association exists between media payloads and keys, a delay in an IPMP AU would result in decryption using an incorrect key. The loss of synchronisation of even a single frame per key period is completely unacceptable.

A preferred embodiment of the method according to the invention further comprises adding a wrapper that encapsulates each encrypted message and includes a unique sequence number.

A wrapper is the data that is put in front of or around the message that provides information about it and may also encapsulate it from view to anyone other than the intended recipient. A wrapper may consist of either a header that precedes the encapsulated data, or a trailer that follows it, or both.

By using a wrapper with a unique sequence number, sequencing information is also attributed to the first message section in the message, which need not necessarily carry a resynchronisation marker with explicit synchronisation information.

Preferably, each unique sequence number is provided in a self-describing format.

Thus, the sequence numbers can be of variable length, allowing for a decrease in data addition.

A preferred embodiment of the method according to the invention further comprises generating at least one key message, each key message carrying data linking at least one unique sequence number added to a message to a key value enabling decryption of at least parts of that message.

This information can be used to associate key data with access unit data to any granularity, regardless of the receiving terminal clock resolution.

An advantageous embodiment of the method according to the invention further comprises encrypting message sections by employing a cipher in a cryptographic mode using feedback, wherein the cipher is re-initialised at the start of each message section.

The use of feedback, also known as chaining, provides additional security. It ensures that identical plaintext blocks are not encrypted to identical ciphertext blocks. It also provides protection against block replay attacks. By re-initialising the cipher at the start of each message section, it is ensured that each message section that is encrypted can be independently decrypted. Encryption of more than one message with the same product or session key is possible without compromising security in any way. The use of explicit or implicit IVs can be assumed in order to prevent use of the cipher in depth.

Schneier, B., "Applied Cryptography", describes a number of cryptosystems that address the issue of random access with varying levels of success. Ciphers and modes that operate in a non-chaining mode meet the criterion of not adding overhead or performing badly in a lossy environment. Electronic Codebook Mode (ECB) has disadvantages for the present application of encryption, since data patterns are not hidden (identical ciphertext blocks imply identical plaintext blocks).

In a preferred variant of the last-mentioned embodiment, a unique sequence number in a resynchronisation marker separating a further message section from another message section is used as an initialisation vector to encrypt the further message section.

Thus, the decryption process can be synchronised in the event of data loss or random seeking into the media.

Techniques such as ECB+OFB (Electronic Codebook Mode+Output Feedback Mode) and CBC (Cipher Block Chaining) with implicit IV generation either add overhead of perform badly in a lossy environment. Generating an implicit IV (initialisation vector) from some characteristics of the message seems to be problematic, since a bit error or data loss of the IV data leads to the garbling of all the plaintext. There are many ciphers and associated modes that cannot perform self-synchronisation, but that are very attractive under a wide range of evaluation criteria. Currently, these must all be ruled out, simply because there is not support in the extensions for the synchronisation of the decryption process in the event of data loss or random seeking into the media. While an explicit sequence number alone does not provide any protection against complete loss of plaintext in the event of a bit error in the sequence number, it does lend itself to error correction. Together with resynchronisation markers it serves to limit the damage caused by bit error in the sequence numbers themselves.

Content varies greatly in complexity and value. The present solution allows support for encryption across this entire spectrum. This may necessitate very efficient, light-weight algorithms that provide acceptable levels of security. Additive stream ciphers are ideal solutions, but require the presence of implicit or explicit sequencing information, the latter being provided by this embodiment of the invention.

According to a further aspect of the invention, there is provided a server for enabling decryption of cryptographically protected data encoding content and arranged into messages, generated by means of a method according to the invention, wherein the server is arranged to transfer at least one key message, each key message carrying data linking at least one unique sequence number added to a message to a key value enabling decryption of at least parts of that message, in response to a request from a client terminal, connected to the server through a network.

Thus, the key messages are distributed from a separate server, allowing separation of the functions of distributing the encrypted content and distribution of the key message stream enabling decryption of the content. This also allows a separate entity to take care of charging for and controlling decryption of the content.

According to another aspect of the invention, there is provided a system for generating cryptographically protected digital data encoding content and arranged into messages, each message being decodable by a decoder application on a client terminal having a service interface to assemble each message for the decoder application, the system being configured to:

retrieve a message from a machine-readable medium;
encrypt at least part of the message; and to
provide the encrypted messages as output in a format enabling a server service interface to arrange the message into at least one packet including at least one header and a payload, each payload including at least part of the message, at least one header including information enabling the service interface on the client to assemble each message for the decoder application from the payload of the packets, wherein the system is configured to separate each message into a first and at least one further message section, to encrypt at least one of the message sections in such a way as to be decryptable independently of the other message sections, and to assemble the encrypted message by adding a resynchronisation marker, separating a message section from an adjacent message section and including an explicit synchronisation sequence, to at least the further message sections.

This system is essentially arranged to carry out the various embodiments of the method of the invention just described above, and provides the associated advantageous effects.

According to another aspect of the invention, there is provided a method of distributing digital data encoding content and arranged into messages from a server to one or more client terminals through a network, each message being decodable by a decoder application on a client terminal, said method including:

transmitting a plurality of data packets from the server through a network through a network interface of the server, each packet including at least one header and a payload, each payload including at least part of a message;
providing each message to a first of a series of at least one service interface between two layers in a protocol stack, installed on the server, each service interface configured to add at least one packet header to the packet encoding information enabling the client to process the remainder of the packet, the method further comprising transmitting packets including at least one header including information enabling a service interface on the client to assemble each message for the decoder application from the payload of the packets, wherein packets are transmitted having a packet payload including a first section and at least one further section, each further section including a resynchronisation marker separating a message section from an adjacent message section and including an explicit synchronisation sequence, at least one of the message sections being encrypted in such a way as to be decryptable independently of the other message sections.

Thus, a method is provided for distributing content such as may be generated using an embodiment of the method for generating cryptographically protected digital data encoding content according to the invention. It is particularly useful for providing resilience against errors and jitter introduced by the network.

According to another aspect of the invention, there is provided a server for distributing digital data encoding content and arranged into messages to one or more client terminals through a network, each message being decodable by a decoder application on a client terminal, said server including:

a network interface for transmitting a plurality of data packets from the server through a network, each packet including at least one header and a payload, each payload including at least part of a message, the server further including a series of at least one service interface between two layers in a protocol stack, each service interface configured to add at least one packet header to the packet encoding information enabling the client to process the remainder of the packet, the server being configured to transmit packets including at least one header including information enabling a service interface on the client to assemble each message for the decoder application from the payload of the packets, wherein the server is configured to distribute packets having a packet payload including a first section and at least one further section, each further section including a resynchronisation marker separating a message section from an adjacent message section and including an explicit synchronisation sequence, at least one of the message sections being encrypted in such a way as to be decryptable independently of the other message sections.

This server is useful for carrying out the method of distributing content according to the invention.

According to another aspect of the invention, there is provided a client terminal for receiving and processing digital data encoding content and arranged into messages, each message being decodable by a decoder application, comprising an interface for receiving a plurality of data packets, each packet including at least one header and a payload, the terminal further including a series of at least one service interface between two layers in a protocol stack, each service interface configured to remove at least one packet header from the packet and process the remainder of the packet using information encoded in the removed packet header, including a service interface configured to assemble the messages for the decoder application from the payload of at least one packet, using information included in at least one header of the packet, wherein the terminal is configured to receive packet payloads including a first section and at least one further section, each further section including a resynchronisation marker separating a message section from an adjacent message section and including an explicit synchronisation sequence, to extract each section by locating the resynchronisation markers, to decrypt each encrypted message section independently of the other message sections, and to insert each decrypted message section in the place of the section from which it was extracted.

The client terminal is able to recover large portions of the encrypted message if errors are introduced into the message during transmission. An error in one of the message sections enables all of the other message sections to be decrypted to the original plaintext message sections, as the client system is able to locate each individual message section and decrypt it independently of the other message sections, i.e. without knowledge of the ciphertext or plaintext of the other message sections.

In a preferred embodiment, the terminal is configured to re-assemble at least part of each received packet after decryption, by adding at least one of the headers of each packet to the payload with the inserted decrypted message sections, before passing it to the service interface.

Thus, the presence of resynchronisation markers allows the payload of a packet to be decrypted before it is processed by the interfaces implementing the protocol stack on the client system, which can be a network protocol stack, for example. This provides increased efficiency and allows independence of the particular protocol stack used.

Preferably, the client terminal further comprises a network interface device for receiving the data packets from a server through a network, wherein the added headers include a header including a network address, identifying the client terminal as intended recipient of the packet.

In this variant, decryption is completely carried out "under the stack". There is thus provided a conditional access system that is universally usable, regardless of the particular kind of terminal and network protocol.

According to a further aspect of the invention, there is provided a method for receiving and processing in a client terminal digital data encoding content and arranged into messages, each message being decodable by a decoder application, comprising
receiving a plurality of data packets by means of an interface of the client terminal, each packet including at least one header and a payload;
providing each packet to a first of a series of at least one service interface between two layers in a protocol stack, each service interface configured to remove at least one packet header from the packet and process the remainder of the packet using information encoded in the removed packet header, including a service interface configured to assemble the messages for the decoder application from the payload of at least one packet, using information included in at least one header of the packet, wherein packet payloads are received comprising a first section and at least one further section, each further section including a resynchronisation marker separating a message section from an adjacent message section and including an explicit synchronisation sequence, wherein each section is extracted by locating the resynchronisation markers, and wherein each encrypted message section is decrypted independently of the other message sections, and each decrypted message section is inserted in the place of the section from which it was extracted.

This method is the method implemented by the client terminal according to the invention, and has essentially the same advantages in terms of error resilience.

According to another aspect of the invention, there is provided a computer program loadable into a computer and having the potential, when run on the computer, to provide the computer with the functionality of a system according to the invention, a server according to the invention, or a client terminal according to the invention.

According to a last aspect of the invention, there is provided a computer program loadable into a computer and having the potential, when run on the computer, to enable the computer to execute a method according to the invention.

BRIEF DESCRIPTION OF THE DRAWINGS

The invention will now be explained in further detail with reference to the accompanying drawings, in which:

FIG. 7 is a schematic of a data packet used to distribute part or all of a message through a network in the data distribution system of FIG. 1.

SPECIFIC DESCRIPTION

A method and system for a content-level encryption protocol are described. In the following description, for purposes of explanation, numerous specific details are set forth in order to provide a thorough understanding of the present invention. It will be evident, however, to one skilled in the art that the present invention may be practiced without these specific details.

Figure 1:
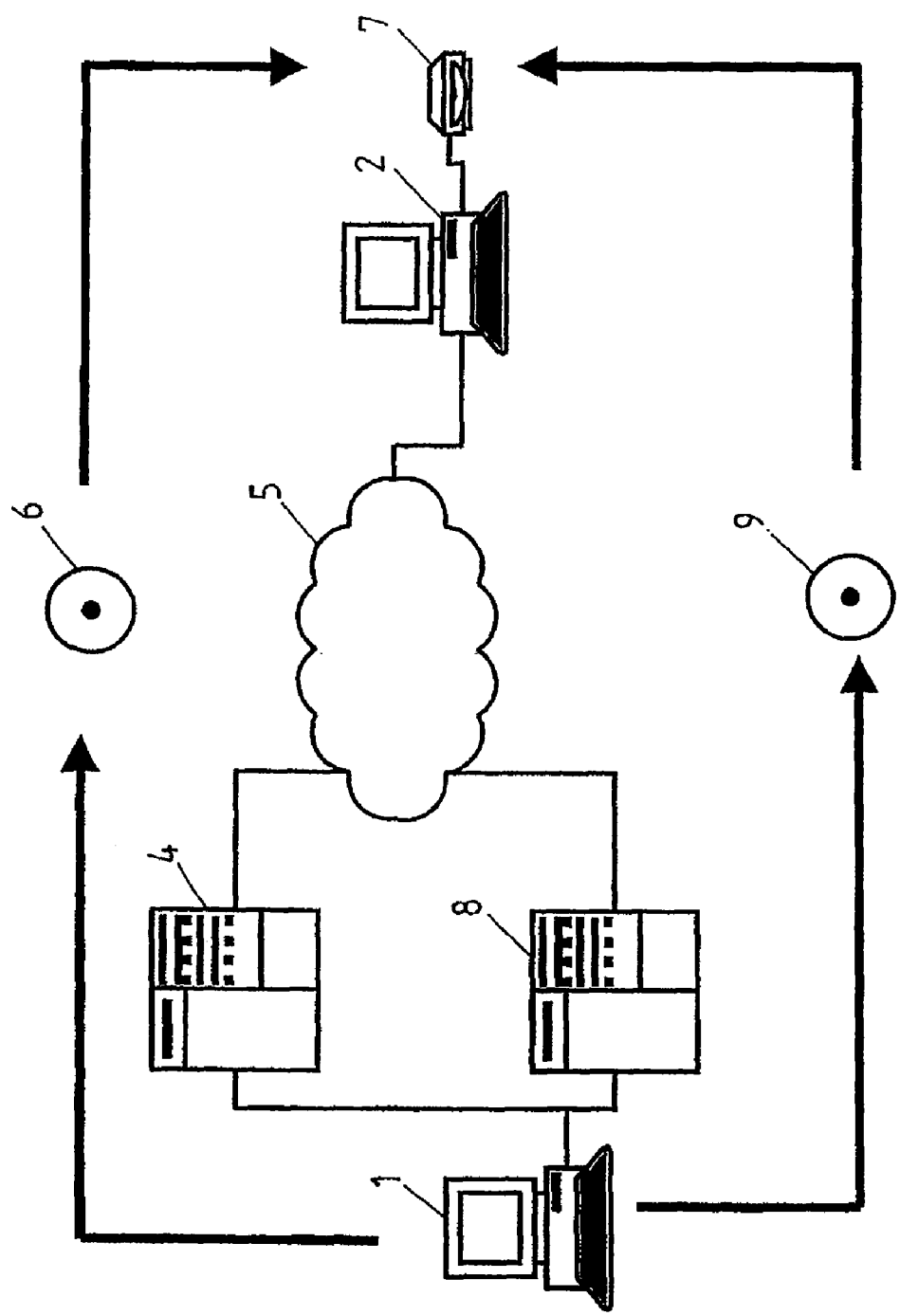
FIG. 1 is a schematic of a data distribution system according to one embodiment of the invention.

In FIG. 1, a content encryption system 1 is used to generate cryptographically protected data encoding content. The data can have been created on the same system 1, or have been received from a separate source. In any case, the data is arranged into messages. Each message is decodable by a decoder application on a client system 2. The term message refers to the unit of data that the encoder application and decoder application use for data exchange. In one example, to be used throughout this description, each cryptographically protected message comprises an encrypted MPEG-4 access unit (AU) 3 (see FIGS. 4, 5A and 5B). An access unit is an individually accessible portion of data within an elementary stream. An elementary stream is a consecutive flow of monomedia data from a single source entity to a single destination entity on the compression layer, the layer that translates between the coded representation of an elementary stream and its decoded representation and incorporates the decoders. It is, however, noted, that the invention can also be used with other types of messages, for example MPEG-2 elementary stream packets.

In one embodiment, the encoded, encrypted messages generated by the content encryption system 1 are transferred to a first distribution server 4 (FIG. 1), connected to a network 5 by means of a network interface, where they are stored. The client system 2 may access the encrypted content by downloading it from the server 4. When the encrypted access units 3 are downloaded, they are encapsulated in Sync Layer packets (SL-packets), consisting of a configurable header and a payload. The payload may consist of one complete access unit or a partial access unit. The SL-packets are subsequently mapped to another packet format used in the network 5, e.g. RTP, MPEG-2 Transport Stream packets, or UDP. Of course, a scenario in which the content encryption system 1 and first distribution server 4 are combined into a single server connected to the network 5 is also possible within the scope of the invention.

In another embodiment, the encoded, encrypted messages generated by the content encryption system 1 are stored on a content carrying medium 6, such as a CD-ROM, DVD-ROM or other suitable medium. Disk drive 7 is used to load the encoded, encrypted messages from the content-carrying medium 6 into the client system 2. In this embodiment, information is stored in the files with the access units, in a format enabling an appropriate interface on the client system 2 to retrieve and assemble the access units (e.g. into SL-packets). This information also allows the client system 2 to pass the access units to the appropriate decoder buffers and thence the correct decoder application, after they have been read from file.

In both embodiments, the encrypted access units are stored in MP4-files. MP4-files typically carry the .mp4 extension. The MP4 file format is designed to contain the media information of an MPEG-4 presentation in a flexible, extensible format that facilitates interchange, management, editing, and presentation of the media. This presentation may be 'local' to the system containing the presentation or may be via a network or other stream delivery mechanism. The file format is designed to be independent of any particular delivery protocol while enabling efficient support for delivery in general. The design is based on the QuickTime format from Apple Computer Inc.

Preferably, the content encryption system 1 encrypts sections of the access units using at least one key (product or session key) having a cycling key value. Content may be encrypted using a single product key or a sequence of time-varying session keys, that are in turn encrypted with the product key. The same encryption scheme can be used for video, audio and any associated data (the content). In other words, the invention provides for content level encryption of MPEG-4 media and data. Examples of the manner in which access units are encrypted will be given below. In the preferred embodiment described herein, a symmetric algorithm is used, i.e. the decryption key is the same as the encryption key. The scheme caters for selective encryption at both the intra-frame and inter-frame levels. (An example of where selective encryption may be desirable could be low complexity devices and low value content that may warrant the encryption of I-frames only, while other applications may require the encryption of texture or motion vector information only.)

According to the invention, unique sequence numbers are added to message sections. The encryption used is such as to enable the client system 2 to decrypt each message section independently of the others, i.e. without knowledge of the data comprised in the other message sections. The content encryption system 1 generates at least one key message, each key message carrying data linking at least one unique sequence number added to a message to a key value enabling decryption of at least parts of that message.

The key messages are preferably also formed into an MPEG-4 elementary stream, i.e. into access units, identified by a separate elementary stream identifier (ES_ID). In the terminology of the MPEG-4 standard, these messages are called IPMP (Intellectual Property Management and Protection) Messages.

In one embodiment, the IPMP Messages are streamed from the first distribution server 4. In another embodiment, the IPMP Message stream is downloaded by the client system 2 from a second distribution server 8. Alternatively, the IPMP Messages could be comprised in a separate file on key stream carrying medium 9, distributed separately, for example a CD-ROM, DVD-ROM, flash memory device, smart card, etc.

In one embodiment, the key values are provided separately. In that case, the key messages contain pointers linked to sequence numbers, enabling the keys to be retrieved by the client system 2. For instance, the keys could be stored on the key stream carrying medium 9, whereas the IPMP Message Stream is provided from the second distribution server 8.

In another embodiment, the key messages also contain the key values. Opaque data in the IPMP Message Stream could associate keys with media in the following manner:
    <key:1 ES=1 seqNum.begin=1 seqNum.end=54>
    <key:2 ES=1 seqNum.begin=54 seqNum.end=169>
    <key:3 ES=1 seqNum.begin=169 seqNum.end=289>

The DTS (delivery time stamp: an indication of the nominal decoding time of the access unit) of the access unit carrying a cycled session key may be advanced so it arrives before the corresponding encrypted media AU(s) 3 (which carry the data encoding the content). It is suggested that the DTS of the IPMP message stream be advanced by one key cycle period. This would allow ample time for network jitter and any preprocessing on the client system 2.

The information given above can then be used to associate key data with content access unit data to any granularity, regardless of the receiving terminal clock resolution.

As mentioned previously, the presence of unique sequence information also allows for sending the entire key stream prior to the delivery of any media. In this case, the DTS of the media access units 3 is not relevant and synchronization is performed purely on the value of the IPMP sequence numbers.

OVERVIEW

This invention may find application in all multimedia delivery systems where it is desired to perform effective content level encryption of data (e.g., MPEG-4 data) using cycled keys. This includes heterogeneous environments such as streaming over IP networks, as well as delivery of MPEG-4 over MPEG-2 transport, or any other error-prone or error-free transport mechanism that may be used to deliver MPEG-4 content.

As indicated above, one embodiment of this invention is based upon a framework for the protection of MPEG-4 content that uses two different constructs:
A secure wrapper for MPEG-4 access units; and
cryptographic Resync Markers.
These two constructs are discussed in detail below.

DETAILED DESCRIPTION

Figure 4:
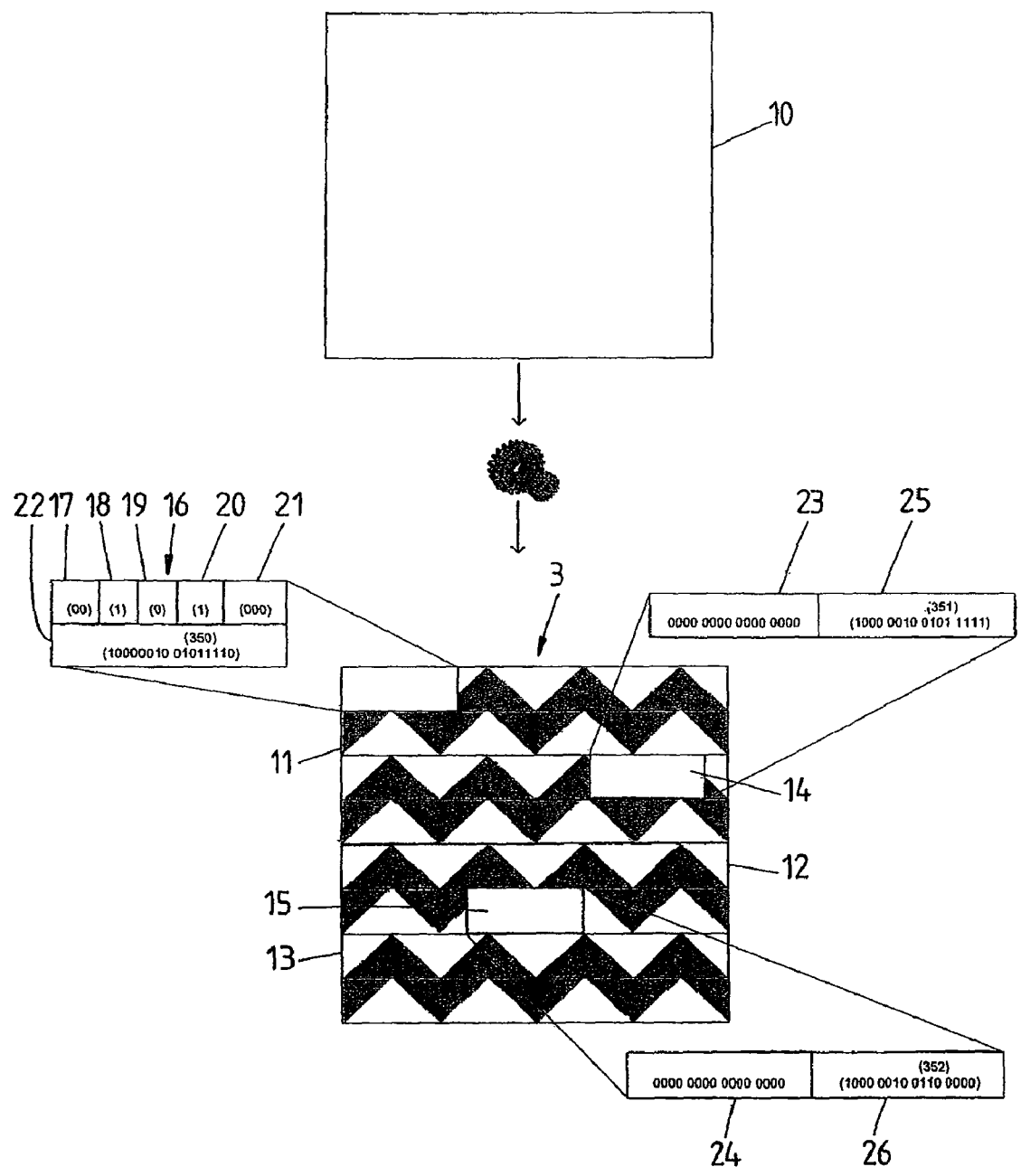
FIG. 4 is a schematic of the format of an MPEG-4 AU after encryption and addition of a wrapper and Resync Markers, according to one embodiment of the invention.

Referring to FIG. 4 in particular, the content encryption system 1 reads an original access unit 10 from a machine-readable medium. In this example, the original access unit 10 is separated into three sections, which are independently encrypted, resulting in the encrypted access unit 3, comprising a first encrypted AU section 11, a second encrypted AU section 12 and a third encrypted AU section 13. A first Resync Marker 14 is added to the second encrypted AU section 12, separating it from the first encrypted AU section 11. A second Resync Marker 15 is added to the third encrypted AU section 13, separating it from the second encrypted AU section 12. A header 16 is prepended to the encrypted AU 3.

1. Secure Wrapper

In one exemplary embodiment of the invention, the secure wrapper of this invention may be thought of as a cryptographic encapsulation envelope that provides security for any "wrapped" MPEG-4 access unit (video frame, audio sample, data unit). The publisher/server/owner protects the content by wrapping individual Aus 3 in these envelopes. The content may then only be unwrapped by an end-user who has the appropriate key/rights. Wrappers of various kinds are quite common and appear in a number of cryptographic protocols. Thus, this invention can operate with a generic wrapper.

In one exemplary embodiment, the wrapper may specifically be defined for use in the MPEG-4 environment. In addition, this invention may use characteristics of the wrapper (the sequence number, etc.) to do "double duty", by also providing the capability to cycle keys, and perform random access. Thus, this invention may operate by taking a number of widely used protocols, and adding thereto specific constructs (such as the Resync Markers 14,15) to create a solution by putting them all together in a framework and using them in a certain way.

The header 16 shown below (and schematically in FIG. 4) is pre-pended to each encrypted AU 3:

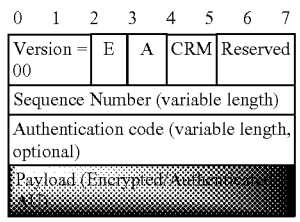

The header 16 comprises the following fields:
Version—two-bit version field 17. Set to zero for the first revision.
E—Bit flag 18 indicating whether the payload is encrypted (1) or clear (0). Note that only the Payload portion is encrypted.
A—Bit flag 19 indicating the presence (1) or not (0) of the Authentication Code field. If present, the authentication code relates to the entire structure-wrapper 16 and AU 3.
CRM—Bit flag 20 indicating presence (1) or not (0) of crypto Resync Markers 14,15 within the AU 3.
Reserved—field 21 of three reserved bits—set to zeros.
Sequence Number—A unique sequence number, carried in a sequence number field 22. The method of generation of the sequence number is considered outside the scope of this document. The value may be monotonically increasing, since Hamming distance attacks do not pose a significant threat against AES in counter mode. The length of this field 22 is not preset, since it uses a self-describing format. The lower seven bits of each byte are used for carrying the sequence number. The setting of the high order bit of each byte indicates the presence of another byte, while the last byte has its MSB set to zero.

As an example, the value 350 would be represented as follows:
11010111 00000010
Authentication Code—An optional field (not shown in FIG. 4) carries a self-describing authentication code. The framework is agnostic to the authentication code scheme to be used, but it is assumed that a keyed hash (HMAC) would be most suitable. Digital signatures are catered for, but the assumption is that these schemes are currently too expensive to be performed at the AU level. Note that the entire structure-header 16+AU 3 is authenticated.
Payload—The original AU 10 or encrypted AU 3. In the event that Crypto Resync Markers 14,15 are used, the encrypted AU 3 will be larger than the original 10.

2. Crypto Resync Markers

In order to enable cryptographic resynchronisation, the markers 14,15 carry some unique and explicit synchronization information 23,24, respectively, to allow the cipher to be "reset" in the event of data loss.

The following is a Crypto Resync Marker that performs well in the encrypted domain. The marker is byte aligned, and consists of sixteen zeros followed by a variable length, self describing sequence counter:
0000 0000 0000 0000 XXXX XXXX
In application, multiple crypto Resync Markers 14,15 may be inserted in a single AU 3. Markers 14,15 located within the AU 3 are easily locatable and therefore guaranteed to be unique. There is a small statistical probability that collisions may still result, since a given plaintext/key combination may result in ciphertext that has the form 0000 0000 0000 0000. Although the probability of this happening is extremely low, the possibility of marker emulation may be removed completely by the use of escape codes. In such an embodiment the presence of emulated Resync Markers is announced by "escaping" them, in a similar manner to C language escape codes.

For typical usage in an error-prone environment, a number of Resync Markers 14,15 may be placed within a given AU 3. The body of each Resync Marker 14,15 contains a unique counter 25,26, respectively that has the same format and usage as the sequence number in the secure wrapper. It is suggested that the counter 25,26 increment monotonically from the initial sequence number carried in the header 16.

Corruption or loss of the sequence number contained in the header 16 does not result in loss of the entire encrypted AU 3. The sequence number within the Resync Marker is preferably absolute, rather than specified as an offset from the sequence counter specified in the header 16. It is also important to ensure that the value of the sequence number in the header of the following AU is greater than the last sequence number used in the current AU 3 in order to avoid using the cipher in depth.

An example of a Resync Marker with a value of 351:
0000 0000 0000 0000 1000 0010 0101 1111

In the event of data loss, locating the next Resync Marker, and using the sequence value in the body of the markers as input to the IV to restart the cipher may achieve synchronization.

Implementation

1. Encryption

Figure 2:
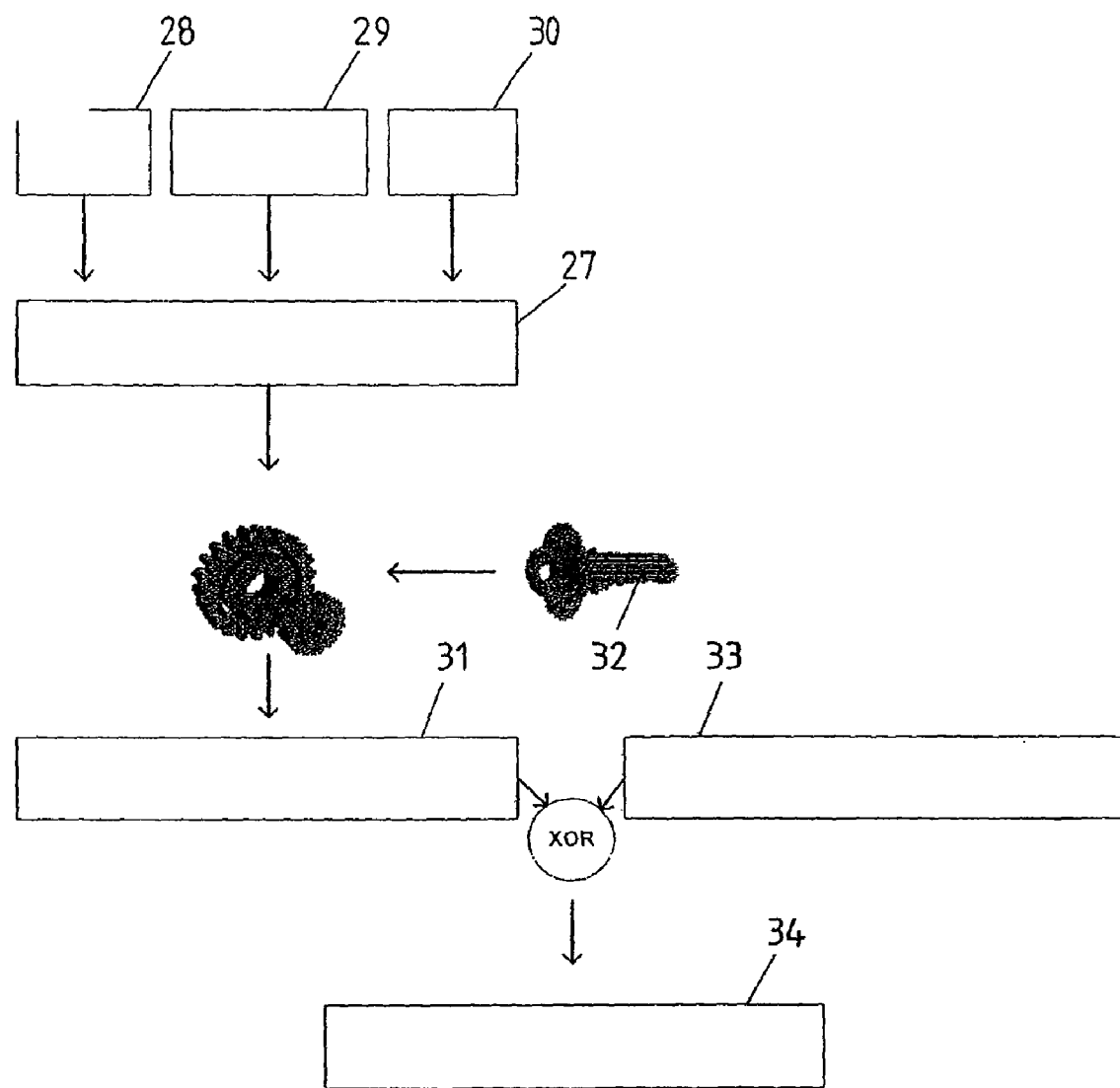
FIG. 2 is a schematic of an encryption process according to one embodiment of the invention.

FIG. 2 is a schematic of the encryption process according to one preferred embodiment of the invention. A counter 27 is formed from a salting key 28, a sequence number 29 and a block index 30. An encrypted counter 31 is generated using a key 32 with a cycling value. The encrypted counter is XOR-ed with a clear AU data block 33, generating an enciphered AU data block 34.

The AES/Rijndael algorithm has been selected for media encryption. The cipher is run in counter mode and makes use of explicit counters (sequence numbers and crypto Resync Markers) carried within the media.

The Rijndael algorithm was selected as the new Federal Information Processing Standard (FIPS) for data encryption and is poised to replace the aging DES and Triple DES standards.

The AES algorithm has been subjected to a significant amount of cryptanalysis during the selection process. The level of analytic effort thrown at AES is comparable to DES. It is widely accepted that the best-known attack method is exhaustive search of the key space.

Some highlights of AES are:
Royalty free and unclassified
Available for worldwide export
allows variable 128, 192 & 256 key and block sizes. All nine combinations of key/block length are possible.
Vast speed improvement over DES in both hardware and software implementations:
8.416 kB/s on a 20 MHz 8051
8.8 MB/s on a 200 MHz Pentium These figures are quoted for ECB mode. Counter mode requires only an additional XOR operation, and thus adds negligible overhead.

Counter mode grew out of the need for high-speed encryption of ATM networks that required parallelisation of the encryption algorithm.

Counter mode encryption operates by applying an encryption function to a monotonically increasing counter 27 to generate a one-time pad. This pad is then XORed with the plaintext. The decryption operation is identical.

Counter mode requires that sender and receiver share a counter in addition to sharing the usual secret key 32. Note that the counter 27 doesn't need to be secret.

For encryption:
$C_i = P_i$ XOR E (counter)
For decryption:
$P_i = C_i$ XOR E (counter)
With the following notation:
E( ) is the encryption function of a block cipher.
$C_i$ is the i-th block of ciphertext.
$P_i$ is the i-th block of plaintext.

It is extremely important that the same counter value not be reused for the same key, since an attacker can then XOR two cipher blocks and obtain an XOR of the two corresponding blocks of plaintext.

Advantages of Counter Mode are:

1. Software efficiency. Since the generation of the key stream is independent of the message, pre-processing may be used in some environments. The pad may be computed in spare cycles, even before the media is available. When the media becomes available, it is simply XORed with the pad. This can result in a throughput of tens of Gbits/s on a contemporary processor.

2. Hardware efficiency. Counter mode is fully parallelisable. Blocks C1, C2, . . . Cn may all be decrypted at the same time.

3. Random access. No chaining, thus no dependency on the Ci−1 th block in order to decrypt Ci.

4. 1 bit error extension. Ciphertext error is limited to the corresponding bit in the plaintext. This is a highly desirable property for streaming video applications in a lossy environment.

5. Low complexity. Both the encryption and decryption processes depend on the encryption function E( ). This is an important criteria when the inverse direction of a cipher D( )=E( )−1 is very different from the "forward" direction. This is the case for Rijndael and many other block ciphers. This makes for extremely low small footprint hardware and software solutions 6. Security. As secure as the underlying block cipher.

7. No increase in size of ciphertext. Ignoring for a moment the use of an explicit Resync Marker, there is no expansion of the ciphertext.

The cipher has known cryptographic strength against an appropriate set of attack methods and has undergone extensive analysis by the world cryptographic community, and is widely adopted. The cipher itself is almost universal, having been accepted by NIST (National Institute of Standards and Technology. The cipher supports a key length of at least 128 bits. Scalability is important, since ideally the same cipher should be capable of being parameterised to protect content that may differ widely in value—from three-minute video clips to Hollywood blockbusters. Key lengths of greater than 128 bits may be overkill for certain applications; support for longer keys is considered an advantage. Adoption of a single parameterised algorithm also promises economy of scale benefits to silicon vendors. The invention does not use obscure ciphers or well-known ciphers in obscure modes. The cryptosystem is self-synchronizing, providing random access or seek capabilities, as well as recovery from data loss. Although these are different scenarios, in practice they depend on the same criteria: the lack of all or part of any preceding data blocks does not influence the ability to decrypt the current data block. The availability of reliable (explicit or implicit) continuity information for the data to be decrypted can therefore be assumed. The cryptosystem provides good error propagation characteristics. Single bit error extension (a bit error in the cipher text results in only the corresponding bit in the plaintext being in error) is very important. Schemes with same block, multiple block or infinite error extension properties do not apply. The cipher offers good performance in both hardware and software across a wide range of computing environments. Key set-up time, key agility and parallelism are all important. The choice of algorithm reflects a "security to a point" policy in which acceptable security concessions are made to increase efficiency and reduce complexity. The cryptosystem offers low data expansion. The size of the resulting cipher text is the same as or close to that of the plaintext, and the size of any additional "security headers" is kept to a minimum. Encryption of more than one message with the same product or session key is possible, without compromising security in any way.

2. Decryption

Figure 3:
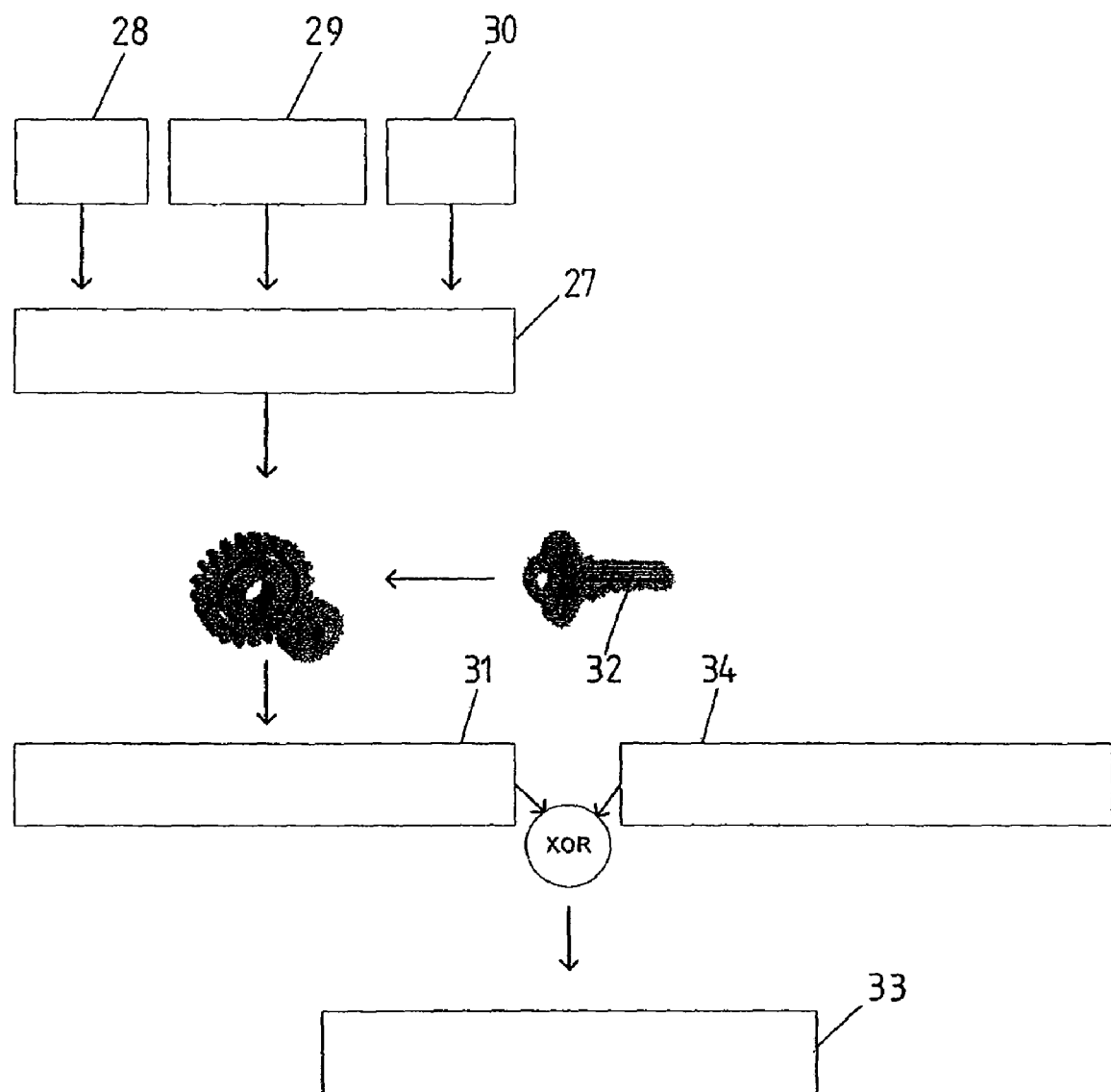
FIG. 3 is a schematic of the decryption process according to one embodiment of the present invention.

FIG. 3 is a schematic of the decryption process (not the symmetry of the encryption/decryption process) according to one embodiment of the invention.

Decryption proceeds as follows in one exemplary embodiment of the present invention:

The decryption engine checks the Encryption flag 18 in the wrapper of the AU 3. If the flag 18 is not set, and no authentication is used, the wrapper may simply be removed, and the original AU 3 passed to the decoder.

If the AU 3 is encrypted, the sequence number in the wrapper is extracted, and used to generate the counter 27.

The counter block size is the same as the selected AES block size. This requirement is due to the fact that the counter 27 is input to the block cipher. This approach is extensible, since it is relatively easy to pad the counter 27 to a larger size in the event that a larger AES block size is specified.

For the purposes of this text, an AES block size of 128 bits will be assumed:

| 0 | 32 | 96 |
|---|---|---|
| 31 | 95 | 127 |
| Salting key (optional) | Sequence Number | Block index |

The salting key 28 is optional, but it should be noted that the lack of a salting key 28 would lead to a complete breakdown of security in the event that multiple bit streams are encrypted with the same key 32. (If, for example, audio and video are encrypted with the same product and session keys, then one or more salting keys 28 are used to prevent using the cipher in depth.) The value of the salting key 28 does not have to be secret.

The 32-bit block index 30 is the block count within a single AU 3. The first 128-bit block of an AU has the index 0; the next has 1 and so on. The block index is reset to zero after every Resync Marker 14,15. Note that the value of the block index 30 is not transmitted, but is computed by the encryption and decryption processes.

The block index 30 must never cycle during the processing of an AU 3. Assuming the worst case of a 128 bit AES block size and a maximally sized video AU 3, a 32-bit block size offers more than enough headroom.

The counter block 27 is then used as the input of the AES block cipher during the pad computation. The processing of the i-th block of an AU is:

$C_i = P_i$ XOR $E(counter)$ for the encryption process
$P_i = Trunc(n, C_i$ XOR $E(counter))$ for the decryption process With the following notation:
$E(\ )$ is the encryption function of the AES cipher.
$C_i$ is the i-th block of the encrypted MPEG-4 AU.
$P_i$ is the n first bytes of the i-th block of the original AU data. The value of n is between 1 and the block size.

The assumption is that the length of each AU 3 is provided to the decryption tool together with the AU data.

The Trunc(x,y) function truncates the x first bytes of the y value.

In the case where Crypto Resync Markers 14,15 are used, the following actions must be taken:

The CRM flag 20 is checked. If CRMs are present in the AU 3, then decryption proceeds as above until a CRM is encountered.

The bit stream is checked to ensure that this is not an emulated CRM that has been escaped. If this is an emulated marker, then the marker should be "un-escaped" and decryption should proceed as normal.

If the marker 14,15 is valid, then the body of the marker should be used to generate a new counter 27:

| 0 | 32 | 96 |
|---|---|---|
| 31 | 95 | 127 |
| Salting key (optional) | Crypto Resync Marker | Block index |

The Block index 30 is reset to zero, and decryption proceeds using this new counter value as input to the cipher.

3. Configuring the Cryptosystem

In one exemplary embodiment of the present invention a, number of parameters may be needed to be set in order to use the cryptosystem effectively.

These may include, for example
The Authentication scheme to be used (if any).
The salting keys 28. Since these do not have to be secret, they could be carried with the configuration information
The decryption cipher and mode. If none is specified, then it is assumed to be AES in counter mode.
If intra-frame selective encryption is used, a description of exactly what data is encrypted.

This information is carried in the IOD (initial object descriptor). The exact format of the data structures to be used is considered outside the scope of this document.

Figure 6:
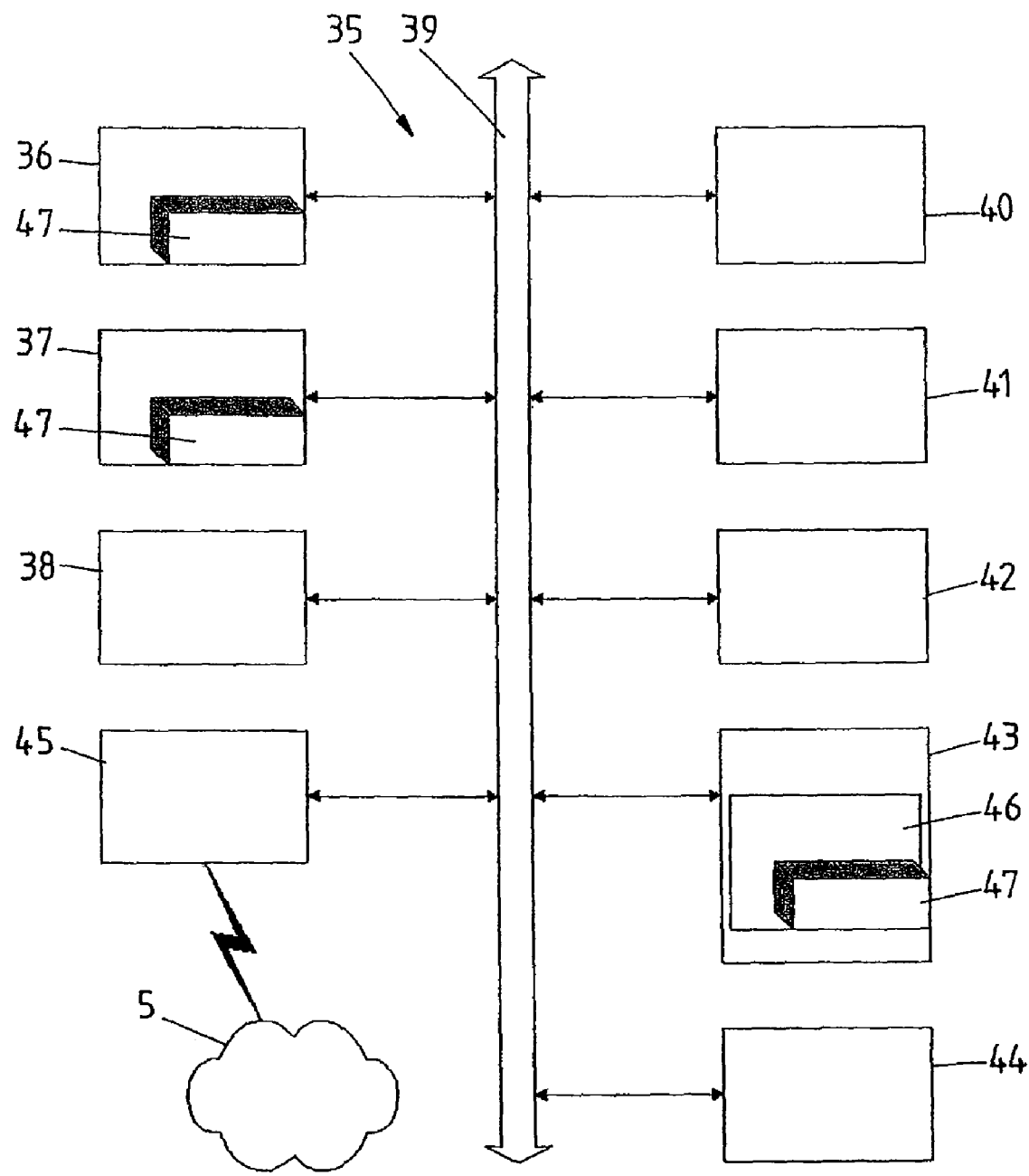
FIG. 6 is a diagrammatic representation of a machine in the exemplary form of a computer system within which a set of instructions, for causing the machine to perform any one of the methodologies discussed herein may be executed.

FIG. 6 shows a diagrammatic representation of machine in the exemplary form of a computer system 35 within which a set of instructions, for causing the machine to perform any one of the methodologies discussed above, may be executed. In alternative embodiments, the machine may comprise a set-top box (STB), a network router, a network switch, a network bridge, Personal Digital Assistant (PDA), a cellular telephone, a web appliance or any machine capable of executing a sequence of instructions that specify actions to be taken by that machine.

The computer system 35 includes a processor 36, a main memory 37 and a static memory 38, which communicate with each other via a bus 39. The computer system 35 may further include a video display unit 40 (e.g., a liquid crystal display (LCD) or a cathode ray tube (CRT)). The computer system 35 also includes an alphanumeric input device 41 (e.g., a keyboard), a cursor control device 42 (e.g., a mouse), a disk drive unit 43, a signal generation device 44 (e.g., a speaker) and a network interface device 45.

The disk drive unit 43 includes a machine-readable medium 46 on which is stored a set of instructions (i.e., software) 47 embodying any one, or all, of the methodologies or functions described herein. The software 47 is also shown to reside, completely or at least partially, within the main memory 37 and/or within the processor 36. The software 47 may further be transmitted or received via the network interface device 45. For the purposes of this specification, the term "machine-readable medium" shall be taken to include any medium that is capable of storing, encoding or carrying a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Figure 5A:
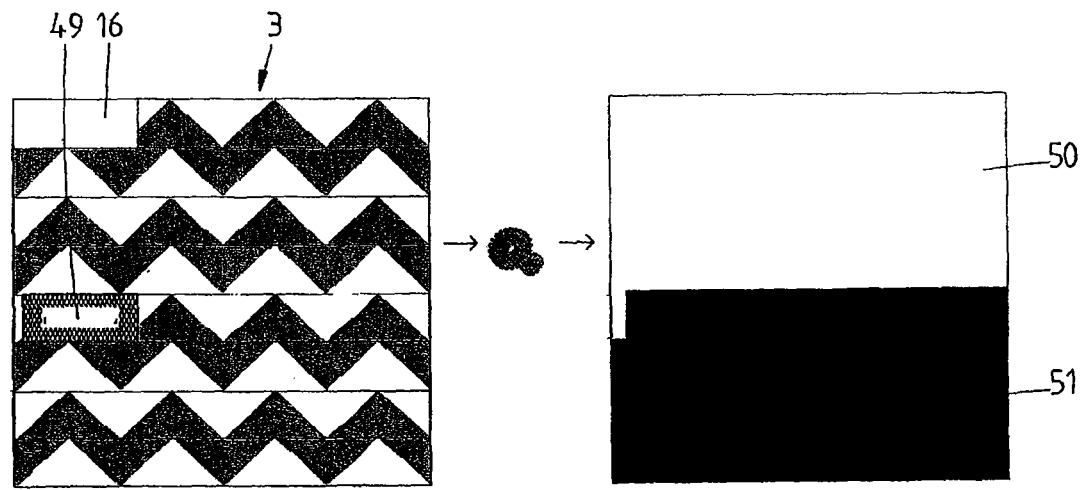
FIGS. 5A and 5B are schematics illustrating the use of resynchronisation markers to resynchronise in the event of data loss, according to one embodiment of the invention.
Figure 5B:
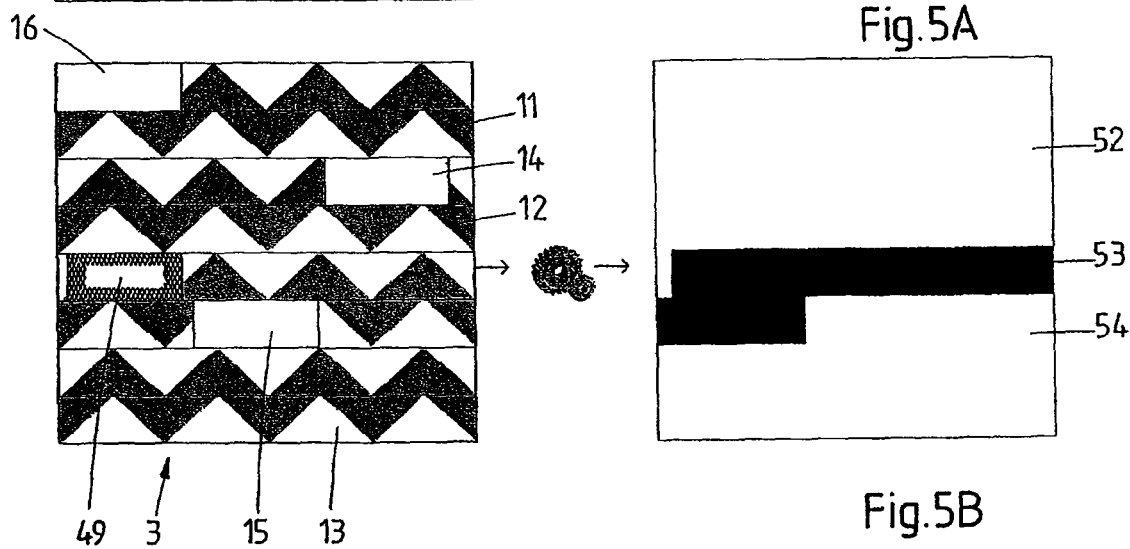

FIGS. 5A and 5B jointly form a schematic illustrating the use of Crypto Resync Markers 14,15 to resynchronise in the event of data loss, according to one embodiment of the present invention. FIG. 5A represents the prior art. No Resync Markers are present. The encrypted AU 3 merely has the header 16 prepended to it. Suppose the client system 2 to receive the encrypted access unit 3 with a block of lost data 49. Using a block cipher in counter mode with only the sequence number of the header 16 being utilisable as initialisation vector, the client system 2 would only be able to decrypt the encrypted access unit 3 correctly up to the lost data 49. After that, it would continue to decrypt the encrypted access unit 3, but would use the wrong counter value in connection with the wrong data block, thus producing garbled plaintext. In effect the decryption process would result in a block 50 of recovered data and a (relatively large) block 51 of lost AU data.

In contrast, the use of crypto Resync Markers 14,15, as shown in FIGS. 5B and 4, means that the decryption process results in a first recovered AU data part 52, a (much smaller) block 53 of lost AU data, and a second recovered AU data part 54. This is due to the fact that the client system 2 is able to recognise the explicit synchronisation information 23 and 24 in the resynchronisation markers 14 and 15, respectively. To extract each of the first, second and third AU sections 11-13, and decrypt them independently.

Turning now to FIG. 7, there is shown a schematic diagram of an IP packet 55, used to distribute the encrypted AU 3 over the network 5 to client system 2. The IP packet 55 comprises an IP header 56, comprising a network address, from which the client system 2 can tell whether it is an or the intended recipient of the IP packet 55. The IP address can be a unique address, a multicast address, or a broadcast address, as is known in the art.

In the exemplary embodiment, UDP is used as the transport protocol. Accordingly, the IP packet 55 comprises a UDP header 57. Additionally, the encrypted access unit 3 has been encapsulated by an application implementing the sync layer, defined in the MPEG-4 standard, on the first distribution server 4. Accordingly, the IP packet comprises an SL header 58. Directly after the SL header 58 comes a header 59 that forms the secure wrapper. It is identical to the header 16 described above, except that it further comprises an explicit synchronisation sequence 60, identical to the explicit synchronisation information 23,24 of the crypto Resync Markers 14,15. The header 59 further comprises the bit flag 18 indicating encryption of the access unit 3, the bit flag 19 indicating authentication, the CRM flag 20, the reserved field 21 and the sequence number field 22. The first encrypted AU section 11 follows the header 59. The second encrypted AU section 12 is separated from the first encrypted AU section 11 by the first crypto Resync Marker 14, comprising the synchronisation information 23 and counter 25. The third encrypted AU section 13 is separated from the second encrypted AU section 12 by the second crypto Resync Marker 15, comprising the synchronisation information 24 and counter 26.

The synchronisation information 23,24,60 is advantageously exploited by the present invention to implement a type of decryption known as decryption under the stack. This type of decrypt is described more fully in co-pending international patent application PCT/US01/41361 by the same applicant as the present application.

The client system 2 comprises an interface that implements the IP protocol. That is to say, the interface processes the IP packet 55 using information in the IP header 56 to determine what to do with the remainder of the IP packet 55. Whereas usually, the remainder is passed to an interface implementing a higher level protocol, i.e. the UDP protocol in this case, and from there on up further, i.e. to an interface implementing the MPEG-4 sync layer in this example, in the present embodiment of the invention, the IP packet 55 is first decrypted.

In this embodiment, the client system 2 receives the entire IP packet 55 as input from the interface implementing the IP protocol on the client system 2. It is agnostic about the remainder of the IP packet 55, but it searches the data in the payload of the IP packet 55 for the explicit synchronisation information 23,24,60. It then extracts the encrypted message sections from the IP packet 55 to decrypt them using the methods described above. Subsequently, the IP packet 55 is re-assembled, and passed back to the interface implementing the IP protocol on the client system 2, whereupon it is processed by the various interfaces implementing the other protocols, i.e. UDP, SL.

Thus, a method and system for a content level encryption protocol have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
distributing digital data encoding content and arranged into messages from a server to one or more client terminals through a network, each message being decodable by a decoder application on a client terminal, said method including,
transmitting a plurality of data packets from the server through a network through a network interface of the server, each packet including at least one header and a payload, each payload including at least part of a message;
providing each message to a first of a series of at least one service interface between two layers in a protocol stack, installed on the server, each service interface configured to add at least one packet header to the packet encoding information enabling the client to process the remainder of the packet; and
transmitting packets including at least one header including information enabling a service interface on the client to assemble each message for the decoder application from the payload of the packets, wherein packets are transmitted having a packet payload including a first section and at least one further section, each further section including a resynchronisation marker separating a message section from an adjacent message section and including an explicit synchronisation sequence, at least one of the message sections being encrypted in such a way as to be decryptable independently of the other message sections.

2. A method according to claim 1, wherein the message sections are encrypted in such a way as to be decryptable using at least one key having a cycling key value.

3. A method according to claim 1, comprising transmitting packets wherein each resynchronisation marker includes a unique sequence number.

4. A method according to claim 1, comprising transmitting packets wherein each message is encapsulated by wrapper including a unique sequence number.

5. A method according to claim 3, wherein each unique sequence number is provided in a self-describing format.

6. A method according to claim 2, further comprising transmitting at least one key message, each key message carrying data linking at least one unique sequence number included in a message to a key value enabling decryption of at least parts of that message.

7. A server for distributing digital data encoding content and arranged into messages to one or more client terminals through a network, each message being decodable by a decoder application on a client terminal, said server including:
- a network interface for transmitting a plurality of data packets from the server through a network, each packet including at least one header and a payload, each payload including at least part of a message, the server further including a series of at least one service interface between two layers in a protocol stack, each service interface configured to add at least one packet header to the packet encoding information enabling the client to process the remainder of the packet, the server being configured to transmit packets including at least one header including information enabling a service interface on the client to assemble each message for the decoder application from the payload of the packets, wherein the server is configured to distribute packets having a packet payload including a first section and at least one further section, each further section including a resynchronisation marker separating a message section from an adjacent message section and including an explicit synchronisation sequence, at least one of the message sections being encrypted in such a way as to be decryptable independently of the other message sections.

8. A server according to claim 7, wherein the message sections are encrypted in such a way as to be decryptable using at least one key having a cycling key value.

9. A server according to claim 7, configured to transmit packets wherein each resynchronisation marker includes a unique sequence number.

10. A server according to claim 7, configured to transmit packets wherein each message is encapsulated by a wrapper including a unique sequence number.

11. A server according to claim 9, configured to provide each unique sequence number in a self-describing format.

12. A server according to claim 8, further configured to transmit at least one key message, each key message carrying data linking at least one unique sequence number included in a message to a key value enabling decryption of at least parts of that message.

13. A client terminal for receiving and processing digital data encoding content and arranged into messages, each message being decodable by a decoder application, comprising:
- an interface for receiving a plurality of data packets, each packet including at least one header and a payload, the terminal further including a series of at least one service interface between two layers in a protocol stack, each service interface configured to remove at least one packet header from the packet and process the remainder of the packet using information encoded in the removed packet header, including a service interface configured to assemble the messages for the decoder application from the payload of at least one packet, using information included in at least one header of the packet, wherein the terminal is configured to receive packet payloads including a first section and at least one further section, each further section including a resynchronisation marker separating a message section from an adjacent message section and including an explicit synchronisation sequence, to extract each section by locating the resynchronisation markers, to decrypt each encrypted message section independently of the other message sections, and to insert each decrypted message section in the place of the section from which it was extracted.

14. A client terminal according to claim 13, wherein the terminal is configured to decrypt the message sections using at least one key having a cycling key value.

15. A client terminal according to claim 13, configured to retrieve a unique sequence number from each resynchronisation marker.

16. A client terminal according to claim 13, wherein each encrypted message is encapsulated by a wrapper and the client terminal is configured to retrieve a unique sequence number from each wrapper.

17. A client terminal according to claim 15, wherein the client terminal is configured to derive the length of a field containing a unique sequence number by parsing a unique sequence number in a self-describing format.

18. A client terminal according to claim 14, further configured to receive at least one key message, each message carrying data linking at least one unique sequence number added to a message to a key value enabling decryption of at least parts of that message, and to select the key values using the data.

19. A client terminal according to claim 15, further configured to decrypt message sections by employing a cipher in a cryptographic mode using feedback, and to re-initialise the cipher at the start of each message section.

20. A client terminal according to claim 19, configured to use a unique sequence number in a resynchronisation marker separating a further message section from another message section as an initialisation vector to decrypt the further message section.

21. A client terminal according to claim 13, further configured to use a block cipher to decrypt a message section and to use a ciphertext block size equal to a divisor of the message section size.

22. A client terminal according to claim 13, further configured to employ a cipher in counter mode, and to re-set the counter before decrypting a message section.

23. A client terminal according to claim 15, further configured to use a unique sequence number in a resynchronisation marker separating a further message section from another message section as the counter to decrypt the further message section.

24. A client terminal according to claim 22, further configured to receive and process messages belonging to separate elementary streams, each stream intended for a decoder application installed on the client terminal, wherein the service interface on the client terminal is configured to assemble the messages into separate elementary streams, wherein the client terminal is further configured to form the counter from a salting key, using a different key for the messages of each elementary stream.

25. A client terminal according to claim 13, wherein the terminal is configured to re-assemble at least part of each received packet after decryption, by adding at least one of the headers of each packet to the payload with the inserted decrypted message sections, before passing it to the service interface.

26. A client terminal according to claim 25, further comprising a network interface device for receiving the data packets from a server through a network, wherein the added headers include a header including a network address, identifying the client terminal as intended recipient of the packet.

27. A method for receiving and processing in a client terminal digital data encoding content and arranged into messages, each message being decodable by a decoder application, comprising:

receiving a plurality of data packets by means of an interface of the client terminal, each packet including at least one header and a payload;

providing each packet to a first of a series of at least one service interface between two layers in a protocol stack, each service interface configured to remove at least one packet header from the packet and process the remainder of the packet using information encoded in the removed packet header, including a service interface configured to assemble the messages for the decoder application from the payload of at least one packet, using information included in at least one header of the packet, wherein packet payloads are received comprising a first section and at least one further section, each further section including a resynchronisation marker separating a message section from an adjacent message section and including an explicit synchronisation sequence, wherein each section is extracted by locating the resynchronisation markers, and wherein each encrypted message section is decrypted independently of the other message sections, and each decrypted message section is inserted in the place of the section from which it was extracted.

28. A method according to claim 27, wherein the message sections are decrypted using at least one key having a cycling key value.

29. A method according to claim 27, comprising retrieving a unique sequence number from each resynchronisation marker.

30. A method to according to claim 27, wherein each encrypted message is encapsulated by a wrapper and the method comprises retrieving a unique sequence number from each wrapper.

31. A method according to claim 29, comprising deriving the length of a field containing a unique sequence number by parsing a unique sequence number in a self-describing format.

32. A method according to claim 28, further comprising receiving at least one key message, each message carrying data linking at least one unique sequence number added to a message to a key value enabling decryption of at least parts of that message, and selecting the key values using the data.

33. A method according to claim 29, further comprising decrypting message sections by employing a cipher in a cryptographic mode using feedback, and re-initialising the cipher at the start of each message section.

34. A method according to claim 33, comprising using a unique sequence number in a resynchronisation marker separating a further message section from another message section as an initialisation vector to decrypt the further message section.

35. A method according to claim 27, further comprising using a block cipher to decrypt a message section and using a ciphertext block size equal to a divisor of the message section size.

36. A method according to claim 27, further comprising employing a cipher in counter mode, and re-setting the counter before decrypting a message section.

37. A method according to claim 29, further comprising using a unique sequence number in a resynchronisation marker separating a further message section from another message section as the counter to decrypt the further message section.

38. A method according to claim 36, further comprising receiving and processing messages belonging to separate elementary streams, each stream intended for a decoder application installed on the client terminal, wherein the service interface on the client terminal is configured to assemble the messages into separate elementary streams, wherein the method further comprises forming the counter from a salting key, using a different key for the messages of each elementary stream.

39. A method according to claim 27, comprising re-assembling at least part of each received packet after decryption, by adding at least one of the headers of each packet to the payload with the inserted decrypted message sections, before passing it to the service interface.

40. A method according to claim 39, wherein the data packets are received through a network interface device of the client terminal, the method including adding a header including an address, identifying the client terminal as intended recipient of the packet.

41. A computer program loadable into a machine-readable non-transitory medium of a computer, which, when run on the computer, provides the computer with the functionality of a client terminal comprising:

an interface for receiving a plurality of data packets, each packet including at least one header and a payload, the terminal further including a series of at least one service interface between two layers in a protocol stack, each service interface configured to remove at least one packet header from the packet and process the remainder of the packet using information encoded in the removed packet header, including a service interface configured to assemble the messages for the decoder application from the payload of at least one packet, using information included in at least one header of the packet, wherein the terminal is configured to receive packet payloads including a first section and at least one further section, each further section including a resynchronisation marker separating a message section from an adjacent message section and including an explicit synchronisation sequence, to extract each section by locating the resynchronisation markers, to decrypt each encrypted message section independently of the other message sections, and to insert each decrypted message section in the place of the section from which it was extracted; and wherein the terminal is configured to re-assemble at least part of each received packet after decryption, by adding at least one of the headers of each packet to the payload with the inserted decrypted message sections, before passing it to the service interface, and further comprising a network interface device for receiving the data packets from a server through a network, wherein the added headers include a header including a network address, identifying the client terminal as intended recipient of the packet.

42. A computer program loadable into a machine-readable non-transitory medium of a computer, which, when run on the computer, enables the computer to execute a method comprising:

distributing digital data encoding content and arranged into messages from a server to one or more client terminals through a network, each message being decodable by a decoder application on a client terminal, said method including, transmitting a plurality of data packets from the server through a network through a network interface of the server, each packet including at least one header and a payload, each payload including at least part of a message;

providing each message to a first of a series of at least one service interface between two layers in a protocol stack, installed on the server, each service interface configured to add at least one packet header to the packet encoding information enabling the client to process the remainder of the packet; and transmitting packets including at least one header including information enabling a service interface on the client to assemble each message for the decoder application from the payload of the packets, wherein packets are transmitted having a packet payload including a first section and at least one further section, each further section including a resynchronisation marker separating a message section from an adjacent message section and including an explicit synchronisation sequence, at least one of the message sections being encrypted in such a way as to be decryptable independently of the other message sections.

* * * * *